United States Patent
Braune et al.

(10) Patent No.: US 6,919,554 B2
(45) Date of Patent: Jul. 19, 2005

(54) METHOD AND APPARATUS FOR SECURING A HAZARDOUS ZONE SURROUNDING A MOVING TOOL

(75) Inventors: Ingolf Braune, Gundelfingen (DE); Georg Plasberg, Bahlingen (DE)

(73) Assignee: Sick AG, Waldkirch/Breisgau (DE)

(*) Notice: Subject to any disclaimer, the term of this patent is extended or adjusted under 35 U.S.C. 154(b) by 86 days.

(21) Appl. No.: 10/234,639

(22) Filed: Sep. 3, 2002

(65) Prior Publication Data

US 2003/0062469 A1 Apr. 3, 2003

(30) Foreign Application Priority Data

Sep. 5, 2001 (DE) .......................................... 101 43 505

(51) Int. Cl.⁷ ................................................ G06M 7/00
(52) U.S. Cl. ......................... 250/221; 72/21.1; 72/21.3
(58) Field of Search ............................... 72/21.3, 21.1, 72/14.3; 250/221, 559.12, 559.13

(56) References Cited

U.S. PATENT DOCUMENTS 4,166,369 A * 9/1979 Nakajima ................... 72/21.1

5,579,884 A 12/1996 Appleyard et al.

FOREIGN PATENT DOCUMENTS

| DE | 2750234 B1 | 1/1979 |
| DE | 19516121 A1 | 11/1996 |
| DE | 69310977 T2 | 12/1997 |
| DE | 19717299 A1 | 2/1998 |
| EP | 0995942 A1 | 4/2000 |
| GB | 2120742 A | 12/1983 |
| WO | WO 00/67932 A1 | 11/2000 |

* cited by examiner

*Primary Examiner*—Thanh X. Luu
(74) *Attorney, Agent, or Firm*—Townsend and Townsend and Crew LLP

(57) ABSTRACT

A method and a sensor for the securing of a hazardous zone of a moving tool having a point of attack is disclosed. A monitored zone with a boundary surface is monitored whose cross-section extends along an arc of a circle or beyond it, wherein the center of the arc of a circle is arranged spaced apart from the point of attack of the tool in the direction of movement of the tool, and wherein the arc of a circle has a radius which is at least so large that the boundary surface of the monitored region extends—at least on the operator side—up to the point of attack of the tool or radially beyond the boundary surface.

45 Claims, 4 Drawing Sheets

METHOD AND APPARATUS FOR SECURING A HAZARDOUS ZONE SURROUNDING A MOVING TOOL

BACKGROUND OF THE INVENTION

The invention relates to a method of securing a hazardous zone of a moved tool which has a point open to attack, in particular of a vertically downwardly moving upper tool of a bending press, with the hazardous zone being predetermined by the extent of the point open to attack of the tool and by the slowing down path of the tool along the direction of movement, with an optoelectronic sensor being moved with the tool and monitoring the hazardous zone and wherein, when an intervention into the hazardous zone is detected, a switching off is triggered for the immediate stopping of the tool movement. The invention further relates to a corresponding optoelectronic sensor.

The background of the invention is the endeavor to prevent injuries to an operator working at the moved tool of a machine, for example in that the operator supplies workpieces to be processed to the tool. In the case of the bending press, the upper tool can—without suitable securing measures—cause an injury to or a cutting off of the fingers or hands of the operator.

A direct risk of injury exists for the operator inside the hazardous zone which extends, starting from the point of attack of the tool, in the direction of movement of the tool. The point of attack of the tool includes, for example, a ram or a plunger, and it typically extends, for example, in particular with the bending press, along a bending line or cutting edge of the moved tool. The hazardous zone thus corresponds to a spatial region which is predetermined by the extent of the point of attack, on the one hand, and by the slowing down path of the tool, that is, by the path still covered by the tool after triggering of a switching off signal, on the other hand.

To secure this hazardous zone, it is known to move at least one transmitter device and one reception device of an optoelectronic sensor along with the tool. This sensor monitors whether an intervention into the hazardous zone has taken place by constantly transmitting and receiving a collimated transmitted light beam. If an intervention is detected by means of an interruption of the transmitted light beam, a switching off procedure is triggered which results in the stopping of the tool movement.

These known securing methods and securing sensors cannot provide the desired safety in all applications. This is initially due to the fact that the part of the hazardous zone actually monitored by the known sensors adopts a certain distance from the point of attack of the tool due to the slowing down path such that the part of the hazardous zone directly adjacent to the point of attack is not monitored. However, the known monitoring principle is above all essentially limited to the recognition of static interventions, that is, of interventions which already exist at the time of the tool movement and are only detected subsequently, that is, when the body part in question of the operator indirectly moves into the monitored part of the hazardous zone due to the moving along of the sensor.

SUMMARY OF THE INVENTION

It is an object of the invention to increase the safety of the operator with a moved tool with respect to all kinds of possible interventions without thereby impairing the economic efficiency of the working process.

This object is satisfied for a method of the kind initially mentioned in that, for the extended securing of the hazardous zone with respect to dynamic interventions, a monitored zone is monitored with a boundary surface whose cross-section extends parallel to the tool movement and perpendicular to the direction of extent of the point of attack of the tool along an arc of a circle or beyond this, with the center of the arc of a circle being arranged spaced from the point of attack of the tool in the direction of movement of the tool, and with the arc of a circle having a radius (monitored radius) which is at least so large that the boundary surface of the monitored zone extends—at least on the operator side—up to the point of attack of the tool or radially beyond it.

The invention provides an additional securing:with respect to so-called dynamic interventions, that is, with respect to interventions from the movement of the operator which take place when the tool movement has already begun. Such dynamic interventions typically take place starting from the operator side, in particular from diagonally above or from the front. It frequently occurs, for example, that the operator notices an unexpected slip of the workpiece to be worked and therefore reaches into the hazardous zone to make a readjustment as a spontaneous reaction— irrespective of the tool movement which has already begun. A sliding of the operator's hands off the workpiece to be pressed against an abutment device during the tool movement can also represent a typical dynamic intervention.

With the invention, a securing takes place with respect to such dynamic interventions in that a monitoring additionally takes place at least along one boundary surface which— while having any desired form—ultimately forms a kind of protective bell. The boundary surface namely has a cross-section with respect to a plane, which extends parallel to the tool movement and perpendicular to the direction of extent of the point of attack of the tool, which extends along an arc of a circle or—in particular in the radial direction—beyond it.

With the invention, a monitored zone is therefore provided having a boundary surface whose minimum extent— in cross-section—is predetermined by an arc of a circle. The center of this arc of the circle lies —relative to the direction of movement of the tool—in front of the point of attack of the tool. In the case of the vertically downwardly moving upper tool of a bending press, the center of the arc of a circle is therefore located at a certain distance below the point of attack.

The arc of a circle moreover has a radius which is selected to be at least so large that the boundary surface extends in the radial direction at least up to the point of attack of the tool so that no monitoring-free gap arises between the boundary surface and the point of attack of the tool with respect to the direction of movement of the tool.

The invention thus ensures an improved securing of the hazardous zone with respect to dynamic interventions. Nevertheless—as with the known securing methods and securing sensors—a non-hazardous and thus permitted readjustment of the workpiece to be worked is possible, namely in that the monitored zone, or its boundary surface, is spatially restricted relative to the direction of movement of the tool such that an intervention into the spatial region adjoining the monitored zone does not trigger a switching off process.

It must still be noted with respect to the securing in accordance with the invention that the monitored zone does not have to form a closed spatial volume. It is rather the case that a closed monitoring of the monitored zone can be dispensed with, for example in the case that an intervention from another direction is precluded due to the geometry of the tool arrangement. This relates in particular to interventions into the hazardous zone from the side of the tool remote from the operator.

It is preferred for the boundary surface of the monitored zone to be adjacent to the tool. It is ensured in this manner that no intervention can take place between the point of attack of the tool and the monitored zone, which could in particular result in a risk of injury with fast dynamic interventions.

The boundary surface of the monitored zone is preferably convexly curved relative to the point of attack of the tool—corresponding to the minimum cross-section extent in accordance with an arc of a circle.

To produce a protective shield with respect to dynamic interventions which is as comprehensive as possible, the arc of a circle—the boundary surface of the monitored zone—preferably extends along a segment angle of at least 30°, in particular of approximately 90° or approximately 180°. These angular data in particular relate to a substantially vertical monitored radius as the starting point with regard to the application background of a bending press.

The cross-section of the boundary surface can therefore, in line with these angular data, have substantially the shape of a quadrant or of a semi-circle which can be interrupted by the tool or by its point of attack. In other words, the monitored zone can substantially have the shape of a quadrant or of a semi-circle.

It is furthermore preferred for the boundary surface of the monitored zone to extend along the direction of extent of the point of attack of the tool. The boundary surface thus covers the jacket surface, for example, of a cylinder segment, in particular of a quarter-cylinder segment or of a half-cylinder segment.

In a preferred embodiment of the invention, the boundary surface along the arc of a circle and/or along the direction of extent of the point of attack of the tool is a surface monitored in a substantially closed manner such that any intervention or penetration of the boundary surface can be detected. Such a closed surface can be realized, for example, by light beam bundles which adjoin one another.

It must further be noted with respect to the shape of the boundary surface of the monitored zone that the minimum extent is admittedly generally predetermined by the cross-section of an arc of a circle. However, the extent can be matched to the shape of the workpiece to be worked. Alternatively or additionally, the boundary surface can be interrupted at a point at which an intervention into the hazardous zone is already inherently precluded due to the design of the tool.

For the dimensioning of the monitored zone, a residual height is preferably taken into account which is always observed for a switching off or stopping of the tool. This residual height is generally defined by the largest body part of the operator which can enter into the hazardous zone with a dynamic approach. The necessary residual height is determined from the defined body part diameter and the permitted squeezing. For finger protection, a possible residual-height can amount, for example, to approximately 10 to 14 mm.

The taking into account of the residual height in the extent of the monitored zone in the direction of movement of the tool can take place such that the extent—starting from the point of attack of the tool—amounts at least to the sum of the previously stated monitored radius and the explained residual height. In the case of the vertically downwardly moving upper tool of a bending press, this consideration therefore results in a downward extension of the monitored zone.

The minimum monitored radius predetermining the extent of the arc of a circle is preferably predetermined by the response time of the, optionally, triggered switching off process and/or by the maximum speed of approach or entry speed of the operator, in particular by the product of the response time and the maximum approach time. It is thereby ensured that, even with the fastest possible intervention, the switching off process is triggered even before the body part of the operator penetrating into the monitored zone comes into contact with the tool. With such a dimensioning, the monitored radius can, for example, amount to between 20 and 50 mm, in particular to between 24 and 40 mm.

Alternatively to this, the speed of movement of the tool, the response time of the switching off process and/or the slowing down path of the tool can be taken into account for the dimensioning of the monitored radius. The monitored radius can in particular amount to at least the sum of the product of the speed of movement and the response time, on the one hand, and the slowing down path, on the other hand. In this case, the total braking path of the tool is taken into account, in particular with regard to an intervention in an extension of the direction of movement of the tool. With such a dimensioning, the monitored radius can amount to, for example, between 6 and 16 mm, in particular to between 10 and 12 mm.

As regards the position of the center of the explained arc of a circle, starting from the point of attack of the tool, this can be arranged spaced by at least the monitored radius in the direction of movement of the tool—in accordance with one of the calculation principles explained above.

The actual monitoring carried out by means of the optoelectronic sensor can substantially take place only along the boundary surface of the monitored zone or along a part thereof. It is also possible to additionally provide an areal monitoring along further surfaces bounding the monitored zone, in particular along that surface which corresponds in cross-section to the radius of the arc of a circle.

Alternatively or additionally, the monitoring of the monitored zone can take place within the boundary surface, that is, with respect to the whole spatial volume enclosed by the boundary surface.

Finally, it must be noted with respect to the movement of the tool that this can be divided into a comparatively fast closing movement and a subsequent slow closing movement for working, with the workpiece being grasped and worked, in particular shaped, only within the framework of this working movement.

The transition from the fast closing movement into the slow closing or working movement preferably takes place at a switch-over point which is programmed or taught by the operator. It is the aim of the operator to place this point as closely as possible to the workpiece surface. The monitoring, or the protective apparatus, is preferably deactivated (so-called muting) from this switch-over point, since the protection now takes place by the slow closing or working movement.

It must still be noted with respect to the optoelectronic sensor provided for the monitoring of the monitored zone that the optoelectronic sensor, as a transmission and reception device, for example, can have an arrangement of adjacent light barriers extending parallel to one another. This is in particular of advantage when only an areal monitoring of the boundary surface of the monitored zone should take place. The reception device can be realized with individual light-sensitive components, in particular when only the boundary surface is monitored.

Alternatively to this, the transmitter device can, for example, have one or more laser diodes or LEDs, whose transmitted light beam is expanded by means of an optical transmitting system such that this transmitter device is suitable for the monitoring of a spatial volume. For this purpose, a spatially resolving reception device can be provided, for example a CCD or CMOS receiver with a linear or matrix-like arrangement of reception elements.

In accordance with the monitoring function, the transmitter device and/or the reception device is preferably arranged—when only the boundary surface is monitored—in accordance with the arc of a circle or—when the total monitored zone is monitored—within the arc of a circle, with this arrangement being related to the already mentioned cross-section parallel to the tool movement and perpendicular to the direction of extent of the point of attack of the tool. With this arrangement, the transmitted light beams preferably extend parallel to the direction of extent of the tool. To enable the tool movement to be carried out without hindrance, it is preferred for the transmitter device and/or the reception device to be provided outside the hazardous zone of the tool in a generally known side arrangement.

In this connection; the transmitter device and the reception device can be designed as a so-called active-active system in a directly opposite arrangement, or as an active-passive system in which the transmitter device and the reception device jointly confront a reflector.

The sensor in accordance with the invention has an evaluation device which is able to recognize an interruption of the transmitted light by means of the received signal of the reception device and which, optionally, triggers the switching off process. This evaluation device naturally does not have to be moved with the tool.

The invention will be described in the following with reference to the figures.

DESCRIPTION OF THE PREFERRED EMBODIMENTS

Figure 5A:
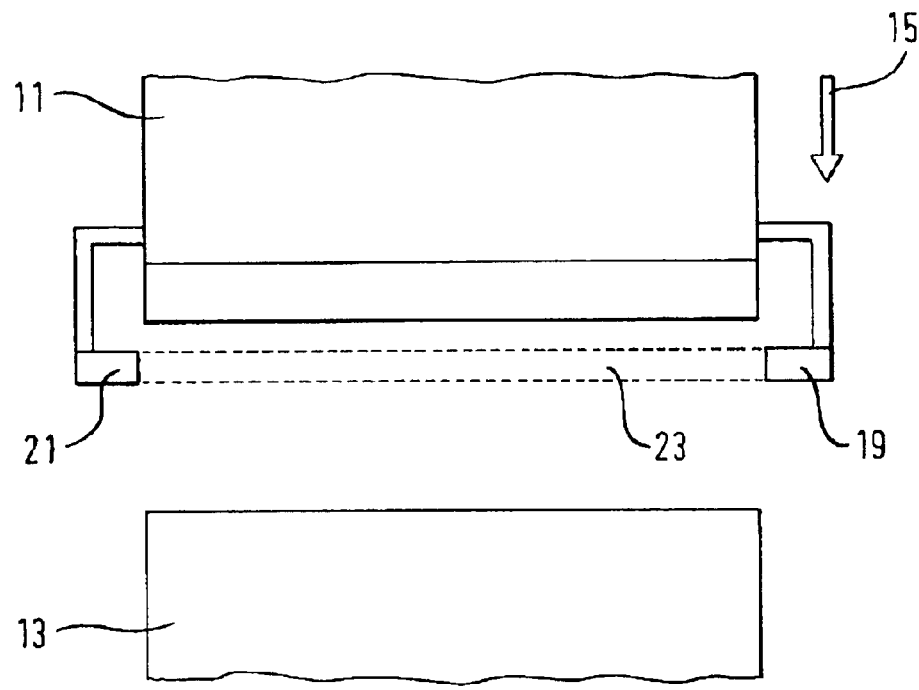
FIGS. 5a and 5b show parts of a known bending press, and indeed in a front view and a side view.
Figure 5B:
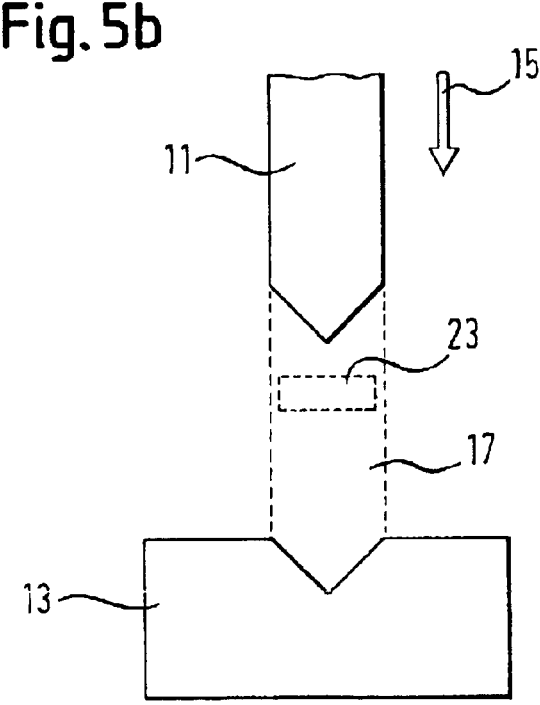

The known bending press shown in FIGS. 5a and 5b has an upper tool 11 and a lower tool 13. The upper tool 11 can be driven to make a vertically downwardly directed closing movement 15 to ultimately shape a workpiece, for example a metal sheet, inserted between the upper tool 11 and the lower tool 13.

The spatial region, which extends, starting from the upper tool 11, in the direction of the closing movement 15 up to the lower tool 13, forms a hazardous zone 17 for the operator who should insert the workpiece between the upper tool 11 and the lower tool 13 and should adjust and hold it there in a specific position (cf. FIG. 5b).

A transmitter device 19 and a reception device 21 are provided for the known monitoring of the hazardous zone 17, are installed in an opposite arrangement at the two sides of the upper tool 11 and accordingly follow the closing movement 15 (FIG. 5a). The transmitter device 19 emits a transmitted light beam 23 in the direction of the reception device 21. The transmitted light beam 23 has a rectangular cross-section. It extends within the hazardous zone 17, and indeed with respect to the direction of the closing movement 15, slightly spaced apart from the upper tool 11 (FIG. 5b).

If an interruption or attenuation of the received transmitted light is detected, a switching off process is triggered to stop the closing movement 15 of the upper tool 11. Such a switching off process takes place, for example, when a hand of the operator is located in the lower part of the hazardous zone and when, due to the downward movement 15 of the upper tool 11, and thus of the transmitted light beam 23, the hand results—from a certain time—in an interruption of the transmitted light beam 23 (static intervention).

Figure 1A:
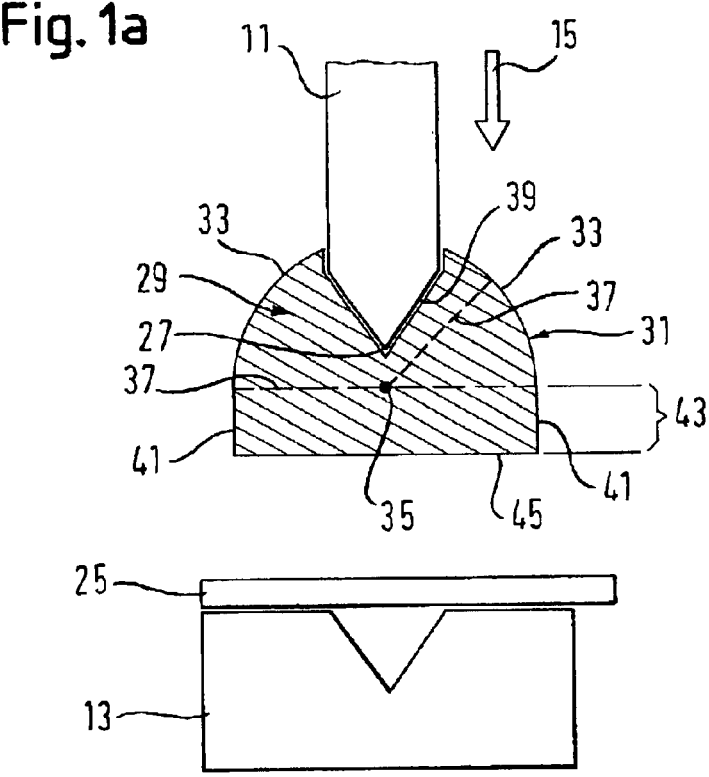
FIGS. 1a and 1b show parts of a bending press in a schematic side view with a further boundary surface of the monitored zone, and indeed at different times of the tool movement.
Figure 1B:
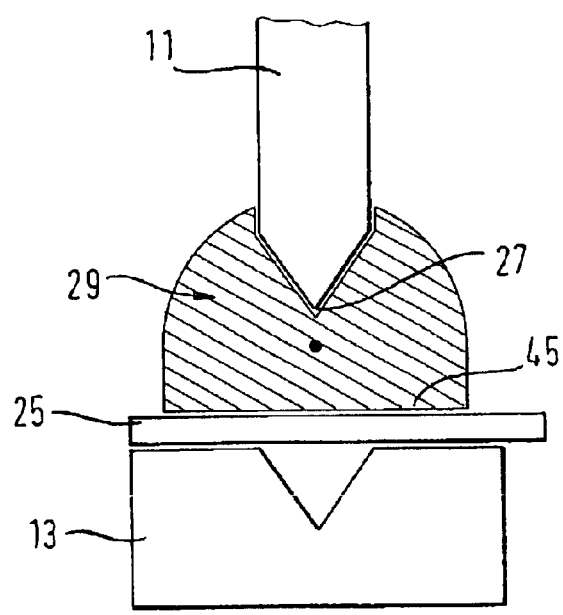

FIGS. 1a and 1b, in contrast, show the monitoring in accordance with the method and the sensor of the invention.

In FIGS. 1a and 1b, an upper tool 11 and a lower tool 13 are likewise shown, on which there lies a workpiece 25 to be shaped. The upper tool 11 initially carries out a fast closing movement 15. The point of attack, that is, the lower tip of the upper tool 11, is characterized by the reference numeral 27. This point of attack 27 extends as a plunger in the direction of observation.

In accordance with the invention, for the securing of the hazardous zone of the upper tool 11, a monitored zone 29 is monitored which is shown in a hatched manner in FIGS. 1a and 1b and is bounded by a boundary surface 31 shown as a solid line in FIGS. 1a and 1b.

The boundary surface 31 has a section in the form of an arc of a circle 33 on either side of the upper tool 11. The two arcs of a circle 33 have a common center 35 which lies below the point of attack 27 of the upper tool with respect to the direction of the closing movement 15. The radius 37 of the respective arc of a circle 33 shown by a broken line in FIG. 1a is dimensioned such that the boundary surface 31 adjoins the upper tool 11 well above the point of attack 27.

In the region of the upper tool 11, the boundary surface 31 has a section 39 which is matched to the outline of the upper tool 11 such that the monitored zone 29 is substantially directly adjacent to the upper tool 11. One end of the respective arc of a circle 33 in the region of the upper tool 11 thus extends substantially in the horizontal direction, and the respectively other end extends substantially vertically downwardly. The two arcs of a circle 33 form a semi-circle whose extent in the region of the upper tool 11 in accordance with the section 39 of the boundary surface 31 is matched to the shape of the upper tool 11.

The monitored zone 29 is moreover downwardly extended, namely in that the boundary surface 31 has two vertical sections 41 which adjoin the vertically running out end of the respective section of the arc of a circle 33. The downward extension of the monitored zone 29 according to the vertical sections 41 thus takes place by a residual height 43.

Finally, the monitored zone 29 is downwardly limited by a horizontal section 45 of the boundary surface 31.

The monitoring of the hazardous zone, both within the monitored zone 29 and along the boundary surface 31, takes place by a transmitter device and a reception device (not shown) in an opposite arrangement in a corresponding manner as shown in FIG. 5a. Accordingly, the monitored zone 29 and the boundary surface 31 extend in accordance with FIGS. 1a and 1b in the direction of observation, that is, parallel to the direction of extent of the point of attack 27 of the upper tool 11.

The procedure of the securing method has the following design:

The upper tool 11 is first driven vertically downwardly, with an activated monitoring, to make a comparatively fast closing movement 15. In this connection, the monitored zone 29, its boundary surface 31, and thus also the center 35 of the arcs of a circle 33, move with the upper tool 11. While this is being done, an intervention can still take place into the hazardous zone beneath the monitored zone 29 or beneath the horizontal section 45 of the boundary surface 31.

If, however, an intervention takes place in any part of the monitored zone 29, or if the boundary surface 31 is penetrated due to an approaching of the operator to any section 33, 39, 41, 45, this is detected as an interruption of the transmitted light emitted by the transmitter device. A switching off process is thereupon triggered to stop the upper tool 11 and to thereby avoid a possible injury to the operator.

As soon as the upper tool 11 and the monitored zone 29 have reached the location shown in FIG. 1b, a switch is made from the fast closing movement 15 to a comparatively slow working movement by which the workpiece 25 should be shaped. At the same time, the monitoring is deactivated. The protection of the operator is now realized by the slow closing movement or working movement.

The securing method and the sensor in accordance with the invention thus provide the advantage in accordance with FIGS. 5a and 5b with respect to the known securing of the hazardous zone that a securing against dynamic interventions by the operator is ensured. If, namely, an intervention into the hazardous zone takes place, for example by a so-called later reaching in, during the fast closing movement 15, it is ensured by the radial extent of the monitored zone 29 along the arcs of a circle 33 about the radius 37 that a switching off of the movement of the upper tool 11 takes place in good time.

The radius 37 is selected with respect to interventions from diagonally above or from the side to be, for example, at least so large that it corresponds to the product of the response time of the switching off process and the highest possible speed of approach of the operator.

Figure 2:
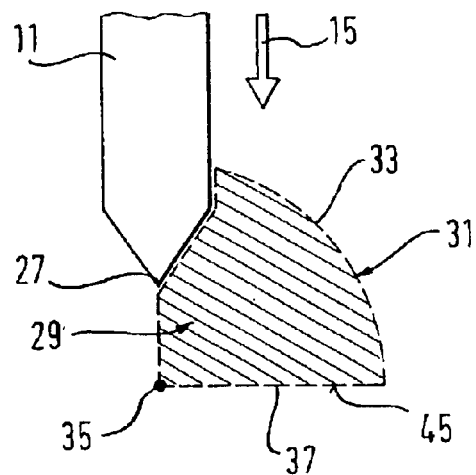
FIGS. 2, 3 and 4 show parts of a bending press in a schematic side view, each with different boundary surfaces of the monitored zone.
Figure 2:
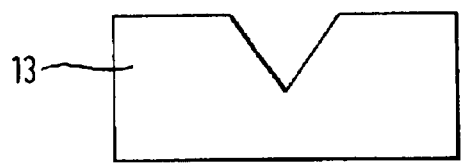
Figure 3:
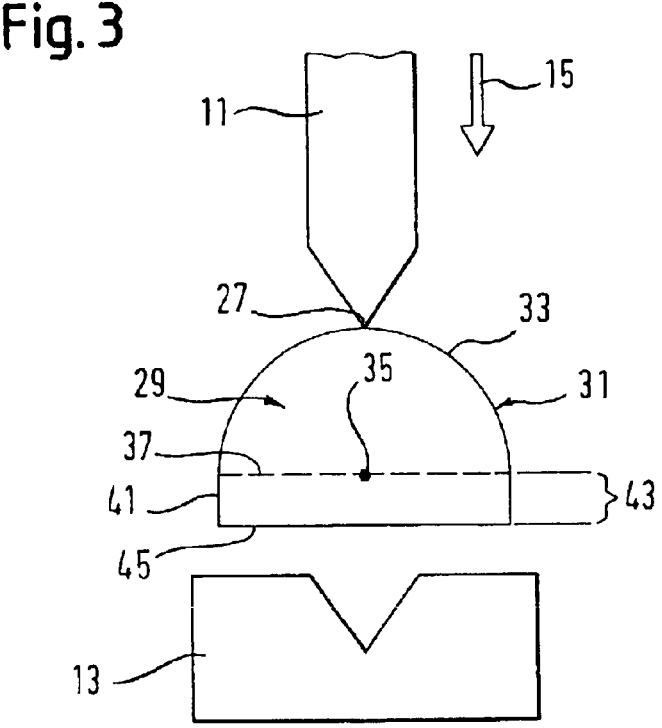
Figure 4:
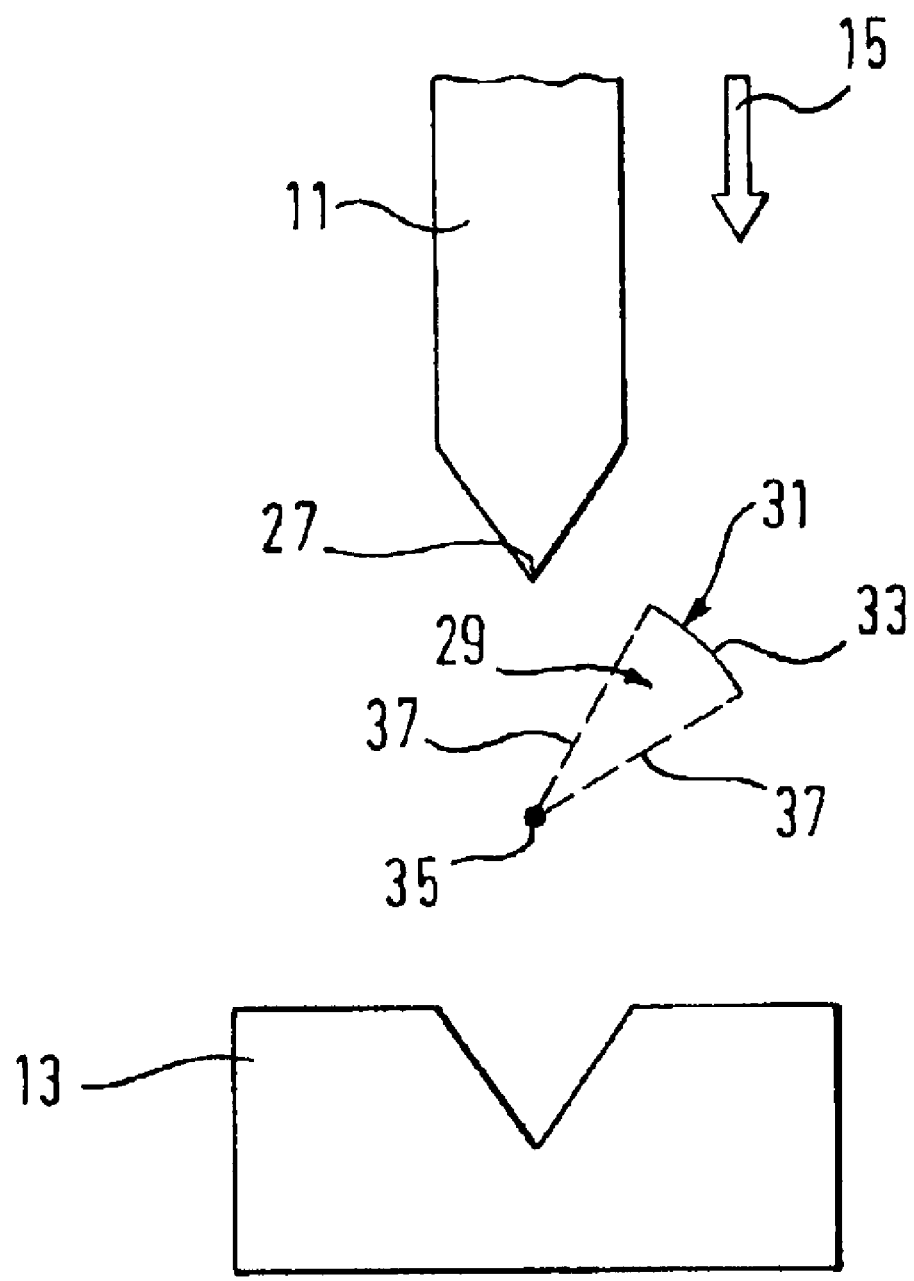

FIGS. 2 to 4 show further embodiments of the monitoring in accordance with the invention in corresponding side or cross-sectional views.

With the embodiment in accordance with FIG. 2, a securing is only provided on the side of the upper tool 11 facing the operator, so that the monitored zone 29 substantially takes up a quadrant surface in the cross-sectional view shown or comprises a quarter-cylinder segment relative to its spatial extent.

In the example in accordance with FIG. 2, the boundary surface 31 of the monitored zone 19 is not separately monitored, as is expressed by the broken-line representation of the boundary surface 31. It is, however, also possible only to monitor the boundary surface 31 here.

In the embodiment in accordance with FIG. 3, a monitoring takes place, for example, along the boundary surface 31, that is, along the arc of a semi-circle 33, of the vertical sections 41 and of the horizontal section 45.

The center 35 of the arc of the circle 33 is here arranged exactly about the radius 37 of the arc of the circle 33 beneath the point of attack 27.

A minimum residual height 43 is provided for the lower part of the monitored zone 29—in a similar manner as with the embodiment in accordance with FIGS. 1a and 1b.

FIG. 4 shows the minimally required extent of the boundary surface 31 required to achieve a securing with respect to interventions from the side or from diagonally above.

A monitoring only takes place here along the arc of a circle 33 (solid line) or along the extension of the arc of a circle 33 in the observation direction. The arc of a circle 33 extends over at least 30°, with the bisector of an angle of the arc of a circle 33, or of the corresponding segment of the circle, forming an angle of approximately 45° with the horizontal. The boundary surface 31 thus extends in an a really convex manner.

The center 35 of the arc of a circle 33 is arranged exactly beneath the point of attack 27 about the radius 37.

It must still be noted relative to the embodiments in accordance with FIGS. 1a, 1b, 2, 3 and 4 that the extent, in particular the radial extent, of the monitored zone 29, or of the boundary surface 31, can also go beyond the minimally required monitored radius. The radius 37 of the arcs of a circle 33 shown in FIGS. 1a and 1b thus does not necessarily correspond to the minimally required monitored radius, but can go beyond this, for example to ensure a complete surrounding of the lower side of the upper tool 11. It is also possible for the boundary surface 31 not necessarily to have the shape of an arc of a circle, but to have, for example, a right-angled extent.

What is claimed is:

1. A method of securing a hazardous zone on a bending press having a vertically downwardly moving upper tool with a point of attack, wherein the hazardous zone is predetermined by an extent of the point of attack of the tool and by a slowing down path of the tool along a direction of movement, wherein an optoelectronic sensor is moved with the tool and monitors the hazardous zone and wherein, when an intervention into the hazardous zone is detected, a switching off process is triggered for an immediate stopping of the tool movement, wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored zone extends up to the point of attack of the tool or radially beyond the point of attack of the tool, and wherein the boundary surface of the monitored zone is convexly curved with respect to the point of attack of the tool.

2. A method in accordance with claim 1, wherein the boundary surface of the monitored zone is adjacent to the tool.

3. A method in accordance with claim 1, wherein the arc of the circle extends over an angle of a segment of a circle of at least 30°, with a bisector line of the angle of the segment of the circle forming an angle of 45° with the horizontal.

4. A method in accordance with claim 3 wherein the angle of the segment of the circle is approximately 90°.

5. A method in accordance with claim 3 wherein the angle of the segment of the circle is approximately 180°.

6. A method in accordance with claim 1, wherein the cross-section of the boundary surface substantially has the shape of a quadrant or of a semi-circle.

7. A method in accordance with claim 1, wherein one end of the arc of the circle extends horizontally in the direction of the tool; and/or wherein one end of the arc of the, circle extends vertically downwardly.

8. A method in accordance with claim 1, wherein the boundary surface of the monitored zone extends parallel to the direction of extent of the point of attack of the tool.

9. A method in accordance with claim 1, wherein the boundary surface is at least substantially closed along the arc of the circle.

10. A method in accordance with claim 1, wherein a shape of the boundary surface of the monitored zone is matched to a shape of the tool or to a shape of a workpiece to be worked.

11. A method in accordance with claim 1, wherein the extent of the monitored zone, starting from the point of attack of the tool, in the direction of movement of the tool amounts to at least the sum of the monitored radius of the arc of the circle and a residual height, where a body part of an operator can approach the hazardous zone.

12. A method in accordance with claim 1, wherein the monitored radius of the arc of the circle is predetermined by a desired response time for switching off movement of the tool and/or by a maximum speed with which an operator can approach the tool, and wherein the monitored radius amounts to at least the product of a response time and a maximum speed of approach.

13. A method in accordance with claim 12, wherein the monitored radius amounts to between 20 and 50 mm.

14. A method in accordance with claim 13 wherein the monitored radius is between 24 and 40 mm.

15. A method in accordance with claim 1, wherein the monitored radius is predetermined by a speed of movement of the tool, by a response time for the switching off process and/or by a slowing down time of the tool, and wherein the monitored radius amounts to at least the sum of the product of the speed of movement and the response speed, on the one hand, and the slowing down path, on the other hand.

16. A method in accordance with claim, 15 wherein the monitored radius amounts to between 6 and 16 mm.

17. A method in accordance with claim 16 wherein the monitored radius is between 10 and 12 mm.

18. A method in accordance with claim 1, wherein a center of the arc of the circle is spaced, starting from the point of attack of the tool, by at least the monitored radius in the direction of movement of the tool.

19. A method in accordance with claim 18 wherein the monitored radius is determined by at least the sum of the product of a speed of movement of the tool and a response time for the switching off process, on one hand, and by a slowing down time of the tool, on the other hand.

20. A method in accordance with claim 1, wherein the center of the arc of the circle moves with the tool.

21. A method in accordance with claim 1, wherein the monitoring essentially takes place areally along at least a part of the boundary surface.

22. A method in accordance with claim 21 wherein the tool has an operator side where an operator of the tool will be positioned, and wherein the at least part of the boundary surface is located on the operator side.

23. A method in accordance with claim 1, wherein the monitoring takes place within the boundary surface within the monitored zone.

24. A method in accordance with claim 1, wherein the movement of the tool is divided into a closing movement and a subsequent, slower working movement.

25. A method in accordance with claim 24, wherein the transition from the closing movement to the working movement takes place at a time at which the monitored zone directly adjoins the desired position of the workpiece to be worked, or adjoins the desired position of the workpiece at a spacing of less than 10 mm; and/or wherein the monitoring of the monitored zone is deactivated at the time of the transition from the closing movement to the working movement.

26. A method in accordance with claim 1, wherein the point of attack of the tool is an elongate bending line or cutting edge.

27. A method in accordance with claim 1, wherein the monitoring of the monitored zone takes place by means of a light transmitter device and of an optoelectronic receiver device.

28. A method according to claim 27 wherein the light transmitter device and the receiver device comprise an arrangement of adjacent light barriers or at least one light transmitter device and at least one spatially resolving receiver device.

29. An optoelectronic sensor for the securing of a hazardous zone on a bending press having a vertically downwardly moving upper tool with a point of attack, wherein the hazardous zone is predetermined by an extent of a point of attack and by a slowing down path of the tool along a direction of movement comprising a transmitter device for transmitting transmitted light in the direction of the hazardous zone, a receiver device for receiving transmitted light from the hazardous zone, and an evaluation device for triggering a switching off process upon a detection of an intervention into the hazardous zone, wherein the sensor moves at least partly with the tool;

wherein, for an extended securing of the hazardous zone, the transmitter transmits light into a monitored zone and the receiver receives light from said monitored zone, wherein the monitored zone is bounded by a boundary surface having a cross-section extending parallel to the tool movement and perpendicular to the direction of extent of the point of attack of the tool along an arc of a circle or in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored region extends up to the point of attack of the tool or radially beyond the point of attack of the tool, and wherein the boundary surface of the monitored zone is convexly curved with respect to the point of attack of the tool.

30. A sensor in accordance with claim 29, wherein a plurality of parallel transmitted light beams, which extend adjacent to one another, are transmitted by the transmitter device.

31. A sensor in accordance with claim 29, wherein the transmitter device has at least one laser diode or LED.

32. A sensor in accordance with claim 29, wherein the transmitter device has an optical transmission system by which a transmitted light beam can be expanded.

33. A sensor in accordance with claim 29, wherein the receiver device has a plurality of photo-electrical reception elements which are each associated with one transmitted light beam; or
wherein the receiver device has at least one of a linear photo-electrical receiver and a matrix-like photo-electrical receiver.

34. A sensor in accordance with claim 33 wherein the photo-electrical receivers comprise CCD or CMOS receivers.

35. A sensor in accordance with claim 29, wherein the transmitter device and/or the receiver device is arranged along the arc of the circle and/or inside the arc of the circle.

36. A method in accordance with claim 1 wherein the hazardous zone includes an operator side where an operator of the tool will be positioned, and wherein the monitored radius is at least so large that at least a part of the boundary surface of the monitored region at the operator side extends to the point of attack of the tool or radially beyond the point of attack of the tool.

37. A method of securing a hazardous zone on a bending press having a vertically downwardly moving upper tool with a point of attack,
wherein the hazardous zone is predetermined by an extent of the point of attack of the tool and by a slowing down path of the tool along a direction of movement,
wherein an optoelectronic sensor is moved with the tool and monitors the hazardous zone and wherein, when an intervention into the hazardous zone is detected, a switching off process is triggered for an immediate stopping of the tool movement,
wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle, the boundary surface being at least substantially closed along the arc of the circle,
wherein a center of the arc of the circle is arranged spaced apart from the point of attack of the tool in the direction of movement of the tool, and
wherein the arc of the circle has a monitored radius which is at least so large that at least a part of the boundary surface of the monitored zone extends up to the point of attack of the tool or radially beyond the point of attack of the tool.

38. A method of securing a hazardous zone on a bending press having a vertically downwardly moving upper tool with a point of attack,
wherein the hazardous zone is predetermined by an extent of the point of attack of the tool and by a slowing down path of the tool along a direction of movement,
wherein an optoelectronic sensor is moved with the tool and monitors the hazardous zone and wherein, when an intervention into the hazardous zone is detected, a switching off process is triggered for an immediate stopping of the tool movement,
wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle, a shape of the boundary surface of the monitored zone being matched to a shape of the tool or to a shape of the workpiece to be worked,
wherein a center of the arc of the circle is arranged spaced apart from the point of attack of the tool in the direction of movement of the tool, and
wherein the arc of the circle has a monitored radius which is at least so large that at least a part of the boundary surface of the monitored zone extends up to the point of attack of the tool or radially beyond the point of attack of the tool.

39. A method of securing a hazardous zone on a bending press having a vertically downwardly moving upper tool with a point of attack,
wherein the hazardous zone is predetermined by an extent of the point of attack of the tool and by a slowing down path of the tool along a direction of movement,
wherein an optoelectronic sensor is moved with the tool and monitors the hazardous zone and wherein, when an intervention into the hazardous zone is detected, a switching off process is triggered for an immediate stopping of the tool movement,
wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle,
wherein a center of the arc of the circle is arranged spaced apart from the point of attack of the tool in the direction of movement of the tool,
wherein the arc of the circle has a monitored radius which is at least so large that at least a part of the boundary surface of the monitored zone extends up to the point of attack of the tool or radially beyond the point of attack of the tool, and
wherein an extent of the monitored zone, starting from the point of attack of the tool, in the direction of movement of the tool amounts to at least the sum of the monitored radius of the arc of the circle and a residual height where a body part of an operator can approach the hazardous zone.

40. A method of securing a hazardous zone on a bending press having a vertically downwardly moving upper tool with a point of attack,
wherein the hazardous zone is predetermined by an extent of the point of attack of the tool and by a slowing down path of the tool along a direction of movement,
wherein an optoelectronic sensor is moved with the tool and monitors the hazardous zone and wherein, when an intervention into the hazardous zone is detected, a switching off process is triggered for an immediate stopping of the tool movement,
wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle,
wherein a center of the arc of the circle is arranged spaced apart from the point of attack of the tool in the direction of movement of the tool,
wherein the arc of the circle has a monitored radius which is at least so large that at least a part of the boundary surface of the monitored zone extends up to the point of attack of the tool or radially beyond the point of attack of the tool, wherein the monitored radius of the arc of the circle is predetermined by a desired response time for switching off movement of the tool and/or by a maximum speed with which an operator can approach the tool, and wherein the monitored radius amounts to at least the product of a response time and a maximum speed of approach.

41. A method of securing a hazardous zone on a bending press having a vertically downwardly moving upper tool with a point of attack, wherein the hazardous zone is predetermined by an extent of the point of attack of the tool and by a slowing down path of the tool along a direction of movement, wherein an optoelectronic sensor is moved with the tool and monitors the hazardous zone and wherein, when an intervention into the hazardous zone is detected, a switching off process is triggered for an immediate stopping of the tool movement, wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored zone extends up to the point of attack of the tool or radially beyond the point of attack of the tool, and wherein the center of the arc of the circle is spaced, starting from the point of attack of the tool, by at least the monitored radius in the direction of movement of the tool.

42. A method of securing a hazardous zone on a bending press having a vertically downwardly moving upper tool with a point of attack, wherein the hazardous zone is predetermined by an extent of the point of attack of the tool and by a slowing down path of the tool along a direction of movement, wherein an optoelectronic sensor is moved with the tool and monitors the hazardous zone and wherein, when an intervention into the hazardous zone is detected, a switching off process is triggered for an immediate stopping of the tool movement, wherein a monitored zone with a boundary surface is monitored which has a cross-section in a plane parallel to the tool movement and perpendicular to the direction of extent of the point of attack of the tool that is at least in part defined by an arc of a circle or that extends in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored zone extends up to the point of attack of the tool or radially beyond the point of attack of the tool, the movement of the tool being divided into a closing movement and a subsequent, slower working movement, and wherein the transition from the closing movement to the working movement takes place at a time at which the monitored zone directly adjoins the desired position of the workpiece to be worked, or adjoins the desired position of the workpiece at a spacing of less than 10 mm; and/or the monitoring of the monitored zone is deactivated at the time of the transition from the closing movement to the working movement.

43. An optoelectronic sensor for the securing of a hazardous zone on a bending press having a vertically downwardly moving upper tool with a point of attack, wherein the hazardous zone is predetermined by an extent of a point of attack and by a slowing down path of the tool along a direction of movement comprising, a transmitter device for transmitting transmitted light in the direction of the hazardous zone, a receiver device for receiving transmitted light from the hazardous zone, and an evaluation device for triggering a switching off process upon a detection of an intervention into the hazardous zone, wherein the sensor moves at least partly with the tool;

wherein, for an extended securing of the hazardous zone, the transmitter transmits light into a monitored zone and the receiver receives light from said monitored zone, wherein the monitored zone is bounded by a boundary surface having a cross-section extending parallel to the tool movement and perpendicular to the direction of extent of the point of attack of the tool along an arc of a circle or in a radial direction beyond an arc of the circle, the boundary surface being at least substantially closed along the arc of the circle, wherein a center of the arc of the circle is arranged spaced apart from the point of attack of the tool in the direction of movement of the tool, and wherein the arc of the circle has a monitored radius which is at least so large that at least a part of the boundary surface of the monitored region extends up to the point of attack of the tool or radially beyond the point of attack of the tool.

44. An optoelectronic sensor for the securing of a hazardous zone on a bending press having a vertically downwardly moving upper tool with a point of attack, wherein the hazardous zone is predetermined by an extent of a point of attack and by a slowing down path of the tool along a direction of movement comprising a transmitter device for transmitting transmitted light in the direction of the hazardous zone, a receiver device for receiving transmitted light from the hazardous zone, and an evaluation device for triggering a switching off process upon a detection of an intervention into the hazardous zone, wherein the sensor moves at least partly with the tool;

wherein, for an extended securing of the hazardous zone, the transmitter transmits light into a monitored zone and the receiver receives light from said monitored zone, wherein the monitored zone is bounded by a boundary surface having a cross-section extending parallel to the tool movement and perpendicular to the direction of extent of the point of attack of the tool along an arc of a circle or in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored region extends up to the point of attack of the tool or radially beyond the point of attack of the tool, and wherein an extent of the monitored zone, starting from the point of attack of the tool, in the direction of movement of the tool amounts to at least the sum of the monitored radius of the arc of the circle and a residual height where a body part of an operator can approach the hazardous zone.

45. An optoelectronic sensor for the securing of a hazardous zone on a bending press having a vertically downwardly moving upper tool with a point of attack, wherein the hazardous zone is predetermined by an extent of a point of attack and by a slowing down path of the tool along a direction of movement comprising a transmitter device for transmitting transmitted light in the direction of the hazardous zone, a receiver device for receiving transmitted light from the hazardous zone, and an evaluation device for triggering a switching off process upon a detection of an intervention into the hazardous zone, wherein the sensor moves at least partly with the tool;

wherein, for an extended securing of the hazardous zone, the transmitter transmits light into a monitored zone and the receiver receives light from said monitored zone, wherein the monitored zone is bounded by a boundary surface having a cross-section extending parallel to the tool movement and perpendicular to the direction of extent of the point of attack of the tool along an arc of a circle or in a radial direction beyond an arc of the circle, wherein a center of the arc of the circle is arranged spaced apart from the point of attack of the tool in the direction of movement of the tool, wherein the arc of the circle has a monitored radius which is at least so large that at least a part of the boundary surface of the monitored region extends up to the point of attack of the tool radially beyond the point of attack of the tool, and wherein the center of the arc of the circle is spaced, starting from the point of attack of the tool, by at least the monitored radius in the direction of movement of the tool.

* * * * *